JOHN W. IRWIN.
Improvement in Harvester Droppers.
No. 122,892. Patented Jan. 23, 1872.
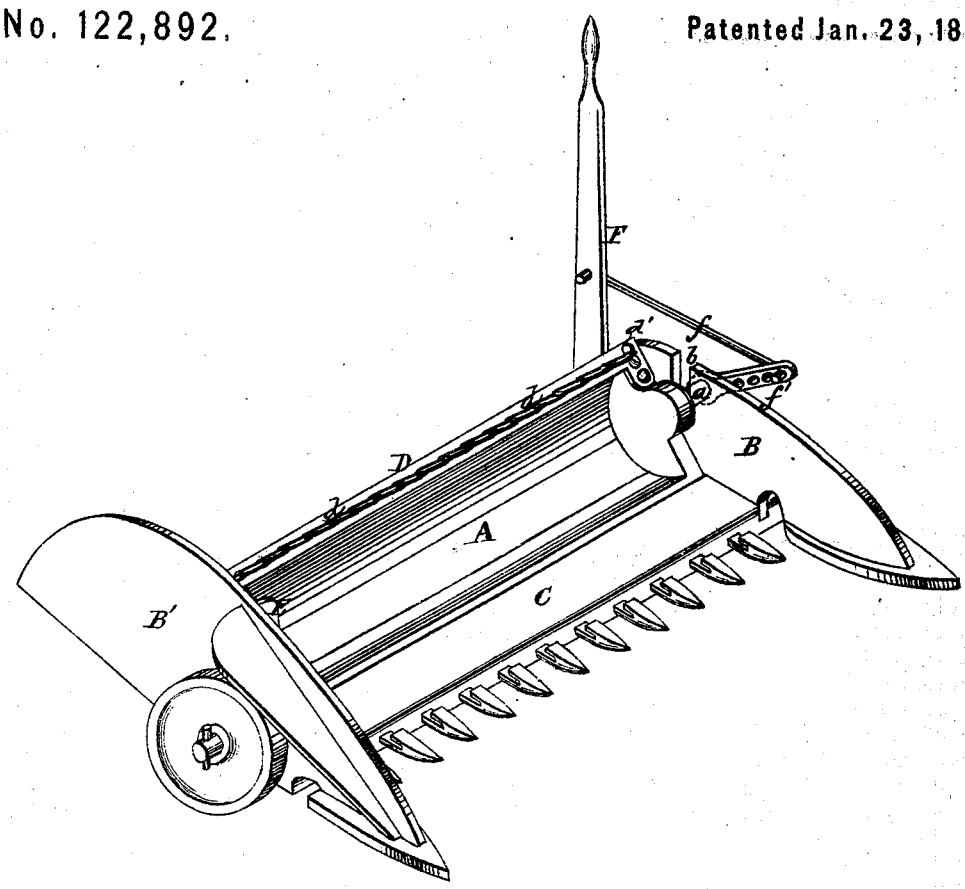
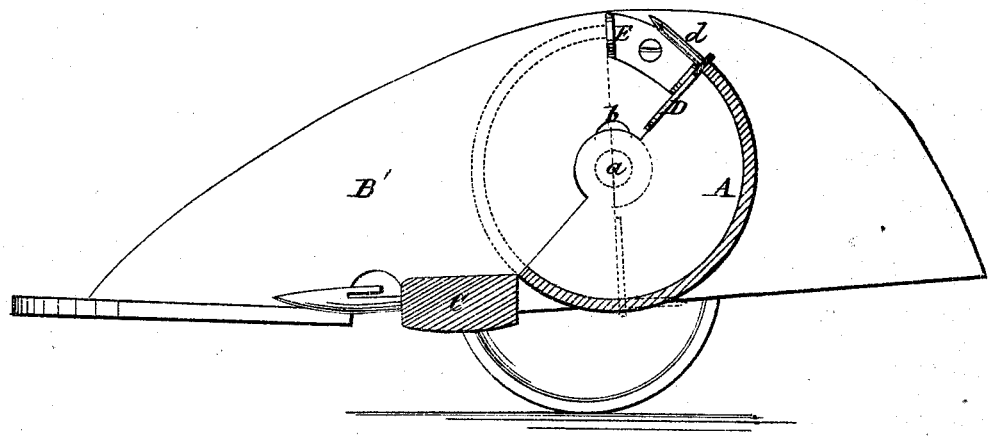
Witnesses
Jas. L. Ewin
Walter Allen
Inventor
John Wesley Irwin
By Knight Bros
Attorney

UNITED STATES PATENT OFFICE.

JOHN W. IRWIN, OF CIRCLEVILLE, OHIO, ASSIGNOR OF ONE-HALF HIS RIGHT TO ANDREW J. HASWELL, CHAS. E. WRIGHT, AND PALMER C. SMITH.

IMPROVEMENT IN HARVESTER-DROPPERS.

Specification forming part of Letters Patent No. 122,892, dated January 23, 1872.

SPECIFICATION.

I, JOHN WESLEY IRWIN, of Circleville, in the county of Pickaway and State of Ohio, have invented a new and useful Harvester-Dropper, of which the following is a specification:

The invention relates to rear delivery-droppers; and consists, primarily, in a new form of the same, to wit: a concavo-convex trough, semicircular, or nearly so, in section, and pivoted behind the cutter-bar on trunnions working in slots in the shoe and divider, so that, when rotated to discharge the gavel, its convex bottom moves near the cutter-bar and acts as a cut-off; also, in an adjustable toothed bar for the rear edge of such trough, to adapt it to grain of various heights; also, in a stop to limit the two motions of the same.

Figure 1 is a perspective view of the dropper as attached to a harvester. Fig. 2 is a longitudinal vertical section on a larger scale.

A represents the dropper, which is a trough, of concavo-convex form, pivoted on trunnions $a$, working in vertically-elongated slots $b$ in the shoe B and divider B' of the machine. C is the cutter-bar, which, together with the other parts of the machine to which the dropper is attached, may be of any approved construction. D is a toothed bar on the rear edge of the trough A, adjustable by perforations $d'$, and used for adapting the dropper to grain of different heights. E is a stop attached to the inner surface of the divider, for limiting the motions of the divider. The dropper may be operated, as shown, by a lever, F, through a rod, $f$, connected to an arm, $f'$, on one of the trunnions, or by connection with a treadle; or automatically, by suitable connection with the driving-wheels.

As the machine moves forward the severed grain is received within the dropper, until a proper quantity is collected, which may be determined by the interval, when the trough is rotated backward by means of the lever F or its equivalent, and the gavel dropped. The trough is then immediately restored to its former position by the same means; or, if desired, by a spring or weight. The stop E arrests the motion of the dropper in both directions. In the receiving position of the dropper its forward edge is parallel with and close to the rear edge of the cutter-bar, and while rocked backward to discharge the gavel its convex bottom is close to the cutter-bar, so as to act in connection therewith as a cut-off to support the severed grain until the dropper is again in receiving position. The full lines in Fig. 2 represent the dropper in receiving position; as shown in dotted lines, it has swung from under the gavel and dropped the same; and its back is in position to operate as a cut-off. On meeting an obstruction, the dropper rises to pass over it, its trunnions moving vertically in the slots $b$; and after passing such obstruction it gravitates to its normal position. The slide D is attached to the ends of the trough A in suitable manner to be moved backward to any desired extent from the rear edge thereof when tall grain is to be cut.

Claims.

1. The adjustable toothed bar D, constructed and arranged upon the semi-cylindrical dropper A, substantially as and for the purposes specified.
2. The combination and arrangement of the cutter-bar C and convex-bottomed dropper A, forming a cut-off, substantially as explained.
3. The stop E, in combination with the semi-cylindrical dropper A, operating substantially as explained.

JOHN WESLEY IRWIN.

Witnesses:
GEO. H. FICKARDT,
W. H. BOYER.